(12) United States Patent
Vidal

(10) Patent No.: US 11,610,398 B1
(45) Date of Patent: *Mar. 21, 2023

(54) SYSTEM AND APPARATUS FOR AUGMENTED REALITY ANIMAL-WATCHING

(71) Applicant: Jonathan Vidal, Jupiter, FL (US)

(72) Inventor: Jonathan Vidal, Jupiter, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/575,683

(22) Filed: Jan. 14, 2022

Related U.S. Application Data

(63) Continuation of application No. 17/006,836, filed on Aug. 30, 2020, now Pat. No. 11,263,458.

(51) Int. Cl.
*G06V 20/20* (2022.01)
*G02C 7/12* (2006.01)
*G10L 25/51* (2013.01)
*G02C 11/00* (2006.01)
*G06V 40/10* (2022.01)
*G02B 27/01* (2006.01)
*H04N 5/33* (2006.01)

(52) U.S. Cl.
CPC ......... *G06V 20/20* (2022.01); *G02B 27/0172* (2013.01); *G02C 7/12* (2013.01); *G02C 11/10* (2013.01); *G06V 40/10* (2022.01); *G10L 25/51* (2013.01); *G02B 2027/014* (2013.01); *G02B 2027/0138* (2013.01); *G02B 2027/0141* (2013.01); *G02B 2027/0178* (2013.01); *H04N 5/33* (2013.01)

(58) Field of Classification Search
CPC .......... G06K 9/00671; G06K 9/00362; G02B 27/0172; G02B 2027/0138; G02B 2027/014; G02B 2027/0141; G02B 2027/0178; G02C 7/12; G02C 11/10; G10L 25/51; H04N 5/33
See application file for complete search history.

(56) References Cited

U.S. PATENT DOCUMENTS

2019/0003984 A1* 1/2019 Kester ................ G06V 20/52
2020/0242848 A1* 7/2020 Ambler .............. G06T 19/006
2021/0325679 A1* 10/2021 Layne ............... G02B 27/0172

* cited by examiner

*Primary Examiner* — Alexander Eisen
*Assistant Examiner* — Kebede T Teshome

(57) ABSTRACT

An Augmented Reality (AR) device or gear or glasses or sunglasses, includes one or more imagers to capture images of an area-of-interest of an environment. A processor performs computer vision analysis or image recognition analysis, and detects one or more animals in the environment; and estimates their relative location, and further classifies them or estimates their properties. The detected and estimated information is then conveyed to the user, as an Augmented Reality layer of information that is super-imposed on the real-life field-of-view that is observed by the user. Optionally, additional indicators are used to convey the information, such as audio output, haptic output, or the like.

20 Claims, 2 Drawing Sheets

SYSTEM AND APPARATUS FOR AUGMENTED REALITY ANIMAL-WATCHING

CROSS-REFERENCE TO RELATED APPLICATIONS

This patent application is a Continuation of U.S. Ser. No. 17/006,836, filed on Aug. 30, 2020, which is hereby incorporated by reference in its entirety.

FIELD

The present invention is related to the field of electronic devices.

BACKGROUND

Fishing is an activity of catching fish or attempting to catch fish. Some fishing techniques include, for example, angling via a hook attached to a fishing line, often attached to a fishing rod and a fishing reel; netting via a fishing net; spear-fishing; or the like.

SUMMARY

The present invention may include an apparatus and a system for Augmented Reality (AR) fishing and fish-watching. For example, a user may wear AR sunglasses or glasses, or other AR gear or AR device, or may utilize an AR-capable smartphone or tablet. The AR device includes one or more imagers or cameras, able to capture images or video of an area-of-interest, such as a body of water or lake or sea or river. A computerized vision processor performs real-time or near-real-time or retrospective processing of information images or video-frames; detects or identifies or recognizes fish or particular marine animals; estimates or determines one or more properties thereof (e.g., species or animal-type or animal-name, size, length, color, moving or non-moving, number of items, or the like); and triggers an output of the information to the user, as an Augmented Reality layer of information (e.g., graphical, textual, emphasizing border, pointing arrow, or the like) that is super-imposed on a view of that area-of-interest as displayed on a screen or touch-screen or view-finder or display unit of the AR device, or on a see-through lens or on see-through lenses of such AR device; thereby providing augmented reality information to the user about fish that are present, and assisting the user to view such fish and optionally assisting the user to capture such fish.

The present invention may provide other and/or additional benefits or advantages.

DETAILED DESCRIPTION OF SOME DEMONSTRATIVE EMBODIMENTS

Figure 1:
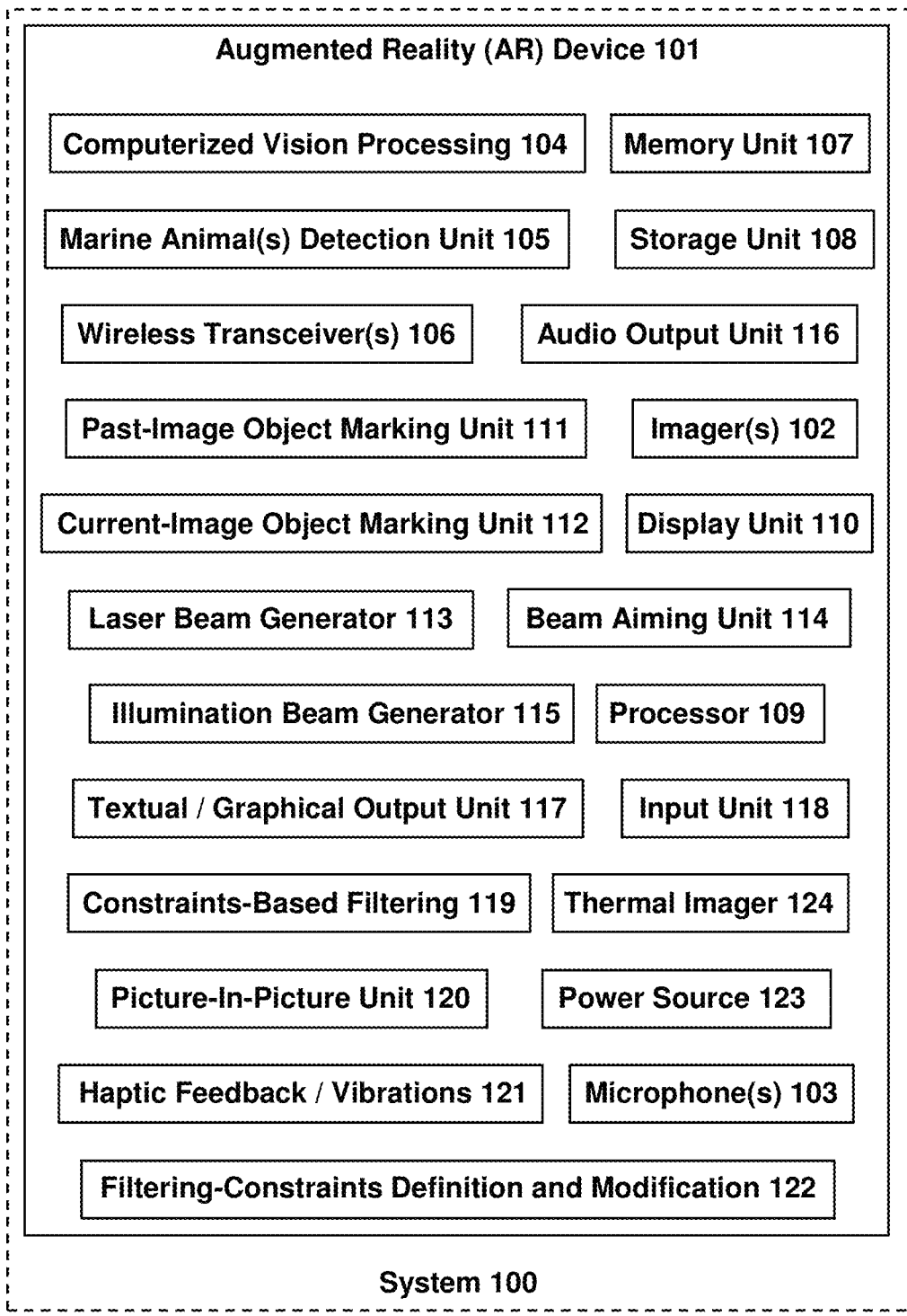
FIG. 1 is a schematic block-diagram illustration of a system, in accordance with some demonstrative embodiments of the present invention.

Some embodiments of the present invention may comprise a system or apparatus or device, having an Augmented Reality (AR) display unit, which may image or scan a nearby marine surroundings or marine environment or body of water; may perform (locally within a portable device or smartphone, or locally within a wearable AR device, and/or remotely or partially remotely via a remote server) computer vision analysis and/or image analysis to detect one or more particular marine animals (e.g., fish, shark, dolphin, or the like), and to then augment the displayed view of the imaged field-of-view by indicating or marking or emphasizing within it the particular location(s) of such marine animal(s); thereby assisting a human viewer to notice and see those particular marine animals, which may be otherwise difficult to see or to notice by the human eye (e.g., due to color similarity of the marine animal and its marine environment; due to glare or reflection by the water; due to sunlight glare; due to camouflage of fish or marine animals; or the like). The computerized vision process may also be configured by the user, to selectively emphasize or to selectively indicate only marine animals of a particular type (e.g., emphasize or mark or indicate only fish, and not dolphins or walrus), and/or of a particular size (e.g., only fish whose length is estimated to be at least 30 centimeters), and/or of a particular quantity or density of marine animals per imaged area (e.g., emphasize or mark or indicate only a "school of fish" that includes at least 10 or more fish moving together as a group at generally same direction and/or speed; emphasize or mark or indicate only a fish that is at least N centimeters long and is also not surrounded by any other fish within an estimated radius of 2 meters around it), and/or of a particular color (e.g., emphasize or show or indicate or mark only snapper fish that are red, and not snapper fish that are blue), and/or of a particular shape (e.g., emphasize or indicate only fish that are elongated such that their length dimension is at least N times greater than their width or thickness dimensions; or, contrarily, emphasize or indicate only short and fat fish, whose length dimension is not more than two times their width or their thickness), and/or of a particular velocity or motion patterns (e.g., emphasize or show or indicate only fish that are swimming in a circle or in a generally circular pattern in the past T seconds; or, only fish that are swimming slower than 1 meter per second in the past T seconds; or, only fish that are swimming faster than 1 meter per second in the past T seconds; or, only fish that are swimming along a particular directions, such as from east to west, or from the sea to the beach, currently or in the past T seconds); or the like. The system may selectively emphasize or indicate such marine animals in one or more particular or pre-defined ways, for example: by marking their representation on a display unit of Augmented Reality (AR) sunglasses or AR helmet or AR glasses or AR gear or AR display unit, or projected onto or projected within one lens or two lenses of such glasses or sunglasses or AR gear or AR unit, or on a screen or touch-screen of a smartphone or a tablet that is held by the user observing the body of water, and/or by generating a visible (yet safe to the human eye) laser beam or illumination beam that is directed towards the estimated real-life location of the detected marine animal, and/or by generating an audible audio message indicating the location or relative location of the detected marine animal (e.g., an audio message of "Red snapper, estimated length 20 centimeters, detected at 3 meters from the shore, azimuth 30 degrees, or to your right, or at the north-east portion of the field-of-view"), and/or by displaying a textual message (e.g., similar to the above) which may be displayed or projected on the glasses or sunglasses or their lenses or on a touch-screen of a smartphone or tablet of the user; by generating an audible tone or beep or sound based on a pre-defined legend of audio indicators (e.g., a single beep indicating a small fish to the right side, two beeps indicate a large fish to the right side, three beeps indicate a small fish to the left side, four beeps indicate a large fish to the left side), or in other suitable ways.

Reference is made to FIG. 1, which is a schematic block-diagram illustration of a system 100, in accordance with some demonstrative embodiments of the present invention.

System 100 may comprise, or may be, or may include, an Augmented Reality (AR) Device 101, which may be able to image or to capture images of the real-life environment surrounding it, and to display or project or add to a digital representation thereof. Augmented Details or Augmented Information.

For example, an imager 102 may be or may comprise a camera, or a set of multiple cameras, able to capture images and/or frames and/or video, and optionally also having an acoustic microphone 103 (or a set of two or more such microphones) able to capture audio.

A Computerized Vision Processing Unit 104 may analyze and process the captured images or video, and may apply one or more Computerized Vision processes or algorithms, or Image Recognition or Object Identification algorithms processes; and may thus detect the existence and the estimated relative location of particular objects, and particularly of marine animal(s). The Computerized Vision Processing Unit 104 may apply algorithms, optionally utilizing Machine Learning (ML) and/or Artificial Intelligence (AI), as well as image comparison, image matching, patch comparisons, patch matchings, or the like, in order to extract high-level understanding and insights and marine animal detections from the captured images or video frames; and may transform the digital image data to symbolic information or insights; such as, generating determination that "the captured image, which has a resolution of 4,000 by 3,000 pixels, comprises a bottom-third image-portion which corresponds to a sandy beach, and an upper two-thirds image portion which corresponds to a sear or body of water, and within that sea or body of water, there is detected: a rectangle of 500 by 350 pixels, located at a horizontal offset of 600 pixels from the left edge of the captured image, and located at a vertical offset of 450 pixels from the top edge of the captured image, and that rectangle of 500 by 350 pixels includes an object that is generally red and which is identified as a Red Snapper fish".

The Computerized Vision Processing Unit 104 may thus comprise, or may be implemented as, a Marine Animal(s) Detection Unit 105, able to analyze such image(s) and to detect the existence of a particular marine animals, its location or relative location within the captured image, its properties or characteristics (e.g., color; contrast; brightness level; whether it is moving or non-moving; shape; estimated dimensions; estimated ratio-of-dimensions, such as length to width ratio; anatomic structure (e.g., has fins or does not have fins, has a sword in its front and is thus a swordfish, has a hammer shaped nose and is thus a hammerhead shark), and even species identification (e.g., hammerhead shark identified by its hammer shaped head; swordfish identified by its sword shaped bill; shark and dolphin differentiated based on shape of fin; or the like), and/or other properties or characteristics. Optionally, the analysis may take into account, or may be based upon, two or more consecutive or non-consecutive images or frames or video-frames, in order to estimate velocity of the marine animal, acceleration, deceleration, number of marine animals per area, or the like. In some embodiments, analysis of two or more such frames or images, may enable the system to recognize or notice or detect a marine animal, due to its slight relative movement or displacement among multiple images or frames, in situations at which a human eye or a human observer would not otherwise discern or notice the movement and/or the existence of the marine animal. In some embodiments, the Computerized Vision Processing Unit 104 may utilize an image comparison algorithm, that compares (e.g., optionally utilizing fuzzy logic and/or fuzzy matching, or "sufficiently close" or "sufficiently similar" matching logic beyond a pre-defined threshold value of similarity), to detect or determine or estimate the existence of a marine animal or a particular type of marine animal and/or its properties or characteristics.

In some embodiments, the AR device 101 may identify or recognize a particular marine animal based on its unique shape or structure, such as by comparing imaged frames or images, or image-portions or image patches, with a pre-defined set of images; thereby recognizing a unique shape of (for example) a swordfish, or a stingray or manta ray, or a hammerhead shark, or the like. In some embodiments, the AR device 101 may detect or may take into account, in the marine animal recognition process, a particular movement pattern that is observed across multiple frames; for example, detecting the unique fin structure or fin shape of a stingray, as it moves within the body-of-water mimicking a flying movement of wings, thereby enabling to detect the stingray or manta ray.

In some embodiment, the AR device 101 may recognize a school (a group, a batch) of small fish, that swim together rapidly; thereby enabling the AR device 101 to estimate that a large marine animal and/or a predator marine animal and/or a large predator marine animal is approaching from the direction that is opposite to their swimming direction; and enabling the AR device 101 to generate an estimation, which is conveyed to the user, that "a school of small fish are moving rapidly from east to west; estimating a large predator fish on the east side of your field-of-view", even before the AR device 101 actually observes or recognizes such predator marine animal in any of the images. In some embodiments, upon such estimation, the AR device may re-configure or re-adjust its settings or its threshold value, to more efficiently or rapidly search particularly for large and/or predator marine animal(s) in captured images.

In some embodiments, the Computerized Vision Processing Unit 104 may be internal and/or integral to the AR Device; or, the Computerized Vision Processing Unit 104 may be an add-on or extension or expansion unit to an existing electronic device (e.g., a smartphone, a tablet, a pair of AR glasses or AR sunglasses or AR helmet or AR gear). In some embodiments, the Computerized Vision Processing Unit 104 may perform some or all of its computations locally within the handheld device held by the user, or within the portable or wearable device that is worn by the user or is attached or mounted on the user's body or on an accessory to the user's body (e.g., on a helmet or a hat); or within a smartphone or tablet or smart-watch of the user. In some embodiments, some or all of the computations may be performed by a separate unit or by a remote unit or a remote server or a cloud computing server; for example, the AR Device 101 may comprise one or more Wireless Transceiver(s) 106, such as Wi-Fi transceiver, Bluetooth transceiver, cellular transceiver (e.g., cellular 3G or 4G or 4G LTE or 5G transceiver), which may transmit or send some or all of the image(s) data to a remote server or to a cloud computing server or to another unit (e.g., a processing unit which may be located in a nearby home or vehicle), and which may then receive back from such entity (or, from a different entity that was re-directed or triggered or utilized by the remote entity to which the data was sent) some or all of the processing results or the computerized vision processing results. The AR device 101 may comprise a memory unit 107, such as Random Access Memory (RAM) or Flash memory, to store information short-term; as well as a storage unit 108, such as Flash-based storage or a Solid State Drive (SSD), to store information long term. The Computerized Vision Processing Unit 104 may be implemented, for example, using a Processor 109 and/or other suitable component(s), such as a Graphics Processing Unit (GPU), a Central Processing Unit (CPU), a Digital Signals Processor (DSP), a controller, an Integrated Circuit (IC), an Application-Specific IC (ASIC), a logic unit, or the like.

In some embodiments, upon detection or estimation of the existence of a marine animal, and/or of its properties or characteristics, the AR device 101 may perform one or more pre-defined operations; particularly in order to indicate or to signal or to emphasize said information to a user of the AR device 101.

For example, a display unit 110 of the AR device 101 may be instructed by the processor 109, to display a real-time image of the surrounding, or to display one of the previously-captured frames or images, and to add to such displayed image an on-screen marking (e.g., border, frame, rectangular border, oval border) and/or a label indicating the detected data (e.g., textual label of "Fish" or "Red Snapper", or "Red Snapper, 25 centimeters"), and/or an on-screen arrow or pointer which points to the location of the detected marine animal within the captured image; and such markings or indicators may be performed, or instructed, by a Past-Image Object Marking Unit 111 which marks such object(s) within a previously-captured or already-captured image, and displays them to the user.

Additionally or alternatively, the display unit 110 of the AR device 101 may be instructed to show the real-time view that is currently being imaged or captured by the imager(s) 102; and a Current-Image Object marking Unit 112 (or a real-time current-view object-marking unit) may operate, in real time or substantially in real time, to add such on-screen markings or emphasizing elements to the currently-imaged field-of-view. In some embodiments, the added marking or the augmented emphasis may be slightly delayed or lagging behind the real or current or actual location or position of the marine animal, which may be moving in the water; however, in many situations, even if such marking may be slightly lagging behind or not precise, such marking may still be extremely useful and informative and valuable to the user; for example, in a situation where the fish is generally non-moving in the water, the marking of the fish based on his processed location at 08:30:01 AM (one second after eight thirty AM), may still be relevant and useful to the user at 08:30:02 AM (one more second later) or at 08:30:04 AM (three seconds later), as this fish is generally non-moving; similarly, a large fish may still be "marked" generally correctly, even if it slowly moves from frame to frame, or from second to second, thereby providing to the user sufficient information regarding the general location of the fish within the field-of-view; similarly, even if the fish has already moved by one foot or by two feet, since its on-screen marking, in many situations this information would still be valuable and useful to the user, as he is now aware of the existence of the fish, as well its approximate location, as well its properties as detected and conveyed to the user by the system.

Additionally or alternatively, the AR device 101 or the system 100 may comprise a laser beam generator 113, able to generate or activate or transmit a visible laser beam towards the estimated location of the detected marine animal. The laser beam may be an eye-safe or a human-safe laser beam, similar to those utilized in a laser-based pointing pen, or a Class 1 laser beam, or a Class 2 laser beam. Optionally, a Beam Aiming Unit 114 may move or aim or target the laser beam towards the location of the detected marine animal, based on coordinates or guidance obtained from the computerized vision process; for example, via a motorized gimbal or motor or mechanical element that moves or rotates or orients or spins the laser generator or the laser transmitter, and/or by using one or more optical elements (e.g., lens, mirrors, prisms) to aim or target such laser beam towards the determined location.

Additionally or alternatively, the AR device 101 or the system 100 may comprise an illumination beam generator 115, able to generate or activate or transmit a visible light beam towards the estimated location of the detected marine animal. The light beam may be in the visible spectrum, and may optionally be at a particular color (e.g., red), and may optionally be a narrow beam or a culminated beam or a focus beam, similar to a narrow beam that some flashlights are capable of producing. Optionally, the Beam Aiming Unit 114 may move or aim or target the illumination beam towards the location of the detected marine animal, based on coordinates or guidance obtained from the computerized vision process; for example, via a motorized gimbal or motor or mechanical element that moves or rotates or orients or spins the illumination beam generator or the light beam transmitter, and/or by using one or more optical elements (e.g., lens, mirrors, prisms) to aim or target such illumination beam towards the determined location.

Optionally, an Audio Output Unit 116 may generate and output an audio output indicating the existence, the location and/or the properties of the detected marine animal; for example, using one or more audio speakers, and optionally by selecting one or more pre-recorded messages or phrases or utterances or phrase-segments from a pool or repository. For example, the Audio Output Unit 116 may select the word "fish" or "red snapper" or "shark" or "hammerhead shark" from a set of pre-recorded audio messages; and then, the pre-recorded audio message "detected now"; and then, may select either "to your right" or "to your left" or "straight ahead" from a set of directional audio messages; and then, may select "size greater than one foot" or "size smaller than one foot" from a size-based set of audio messages; or the like. The combined set of audio segments is outputted to the user as an audible message.

Optionally, a Textual/Graphical Output Unit 117 may generate and display a textual message, similar to the above-mentioned construction of the audio message; and may optionally augment it further with one or more selected images from a pre-defined pool of images, for example, showing a stock photo or a stock graphic of a "hammerhead shark" in addition to (or instead of) the textual label "hammerhead shark", and/or near an arrow or on-screen pointer that point to that marine animal, or near other on-screen marking or emphasis of such marine animal.

In some embodiments, the user may utilize an input unit 118 of AR device 101, or of system 100, or of another electronic device (e.g., smartphone, tablet, smart-watch) which may be in communication (directly or indirectly) with AR device 101 or with system 100, in order to provide user input with regard to types of marine animals that the user wants (or, does not want) to be marked or emphasized or indicated. For example, the user may utilize the input unit 118 to indicate to system 100, to selectively mark or emphasize only marine animals of a particular type (e.g., only fish, and not mammals) or a particular species (e.g., only snapper, and not tilapia) or a particular size or range-of-sizes (e.g., only fish that are at least one foot long; or only fish that are no more than one foot long; or only fish in the range of 1 to 2 feet long), or a particular ratio of dimensions; or to selectively emphasize or to selectively indicate only marine animals of a particular type (e.g., emphasize or mark or indicate only fish, and not dolphins or walrus), and/or of a particular size (e.g., only fish whose length is estimated to be at least 30 centimeters), and/or of a particular quantity or density of marine animals per imaged area (e.g., emphasize or mark or indicate only a "school of fish" that includes at least 10 or more fish moving together as a group at generally same direction and/or speed; emphasize or mark or indicate only a fish that is at least N centimeters long and is also not surrounded by any other fish within an estimated radius of 2 meters around it), and/or of a particular color (e.g., emphasize or show or indicate or mark only snapper fish that are red, and not snapper fish that are blue), and/or of a particular shape (e.g., emphasize or indicate only fish that are elongated such that their length dimension is at least N times greater than their width or thickness dimensions; or, contrarily, emphasize or indicate only short and fat fish, whose length dimension is not more than two times their width or their thickness), and/or of a particular velocity or motion patterns (e.g., emphasize or show or indicate only fish that are swimming in a circle or in a generally circular pattern in the past T seconds; or, only fish that are swimming slower than 1 meter per second in the past T seconds; or, only fish that are swimming faster than 1 meter per second in the past T seconds; or, only fish that are swimming along a particular directions, such as from east to west, or from the sea to the beach, currently or in the past T seconds); or the like. In response to such user-defined constraints or filtering criteria, the computerized vision processing unit 114 may be adjusted or configured to discard or to filter-out objects that do not meet such criteria, and/or to filter-in and keep information about objects that meet such criteria. Additionally or alternatively, in some embodiments, a Constraints-Based Filtering Unit 119 may receive from the Computerized Vision Processing Unit 104 non-filtered detection data, and may then perform the selective filtering (filter in, filter out) of the objects based on the filtering criteria or constraints defined by the user; thereby passing on to the output means (e.g., the object marking units 111 or 112, or the other output means) only the data about objects that meet the criteria set by the user.

In some embodiments, the Constraints-Based Filtering Unit 119, or the processor 109, or other unit or component of system 100 or of AR device 101, may utilize a user interface (UI) or a graphical UI (GUI) which may be accessed via the display unit 110, and that the user may interact with (e.g., via the input unit 118, or via the display unit 110 itself if implemented as a touch-screen), to enable the user to enter, set, view and/or modify the selection criteria or the filtering-in or filtering-out constraints. In some embodiments, system 100 may allow saving or storing, and later accessing, multiple profiles or groups of filtering criteria or constraints; such that a particular user may save and utilize on Sunday a first set of constraints that selectively indicates to him only small fish, and such that the same user may save an utilize on Monday a second, different, set of constraints that selectively indicates to him only large fish. The entry, viewing, modification, storing and/or retrieval of such sets of filtering constraints or filtering criteria, may be performed via a Filtering-Constraints Definition and Modification Unit 122.

In some embodiments, optionally, the Computerized Vision Processing Unit 104 may utilize one or more biological-based rules or behavioral-based rules, in order to detect a particular marine animal, and/or in order to characterize or classify it. For example, the Computerized Vision Processing Unit 104 may utilize a rule, that a Shark cannot swim backwards, whereas some fish can swim backwards, in order to classify a backward-swimming object (e.g., having eyes in its front region) as a fish and not as a shark. Similarly, anatomy based rules or physiology based rules may be used, from a pool or rules or descriptors of marine animals, to identify or recognize marine animals that have a unique shape or structure, such as a swordfish having a sword shaped bill, a snapping turtle, an alligator in a lake, a hammerhead shark, a manta ray or a sting ray, a dolphin, a shark, or the like.

In some embodiments, optionally, the Computerized Vision Processing Unit 104 may further determine or estimate whether the detected marine animal is generally considered edible by humans or non-edible (e.g., having poisonous content, or having dangerous content, or having dangerously elevated of iron or other ingredients or elements), and may trigger the marking or the conveying of such information to the user. For example, the Computerized Vision Processing Unit 104 may detect a marine animal, may further classify it as a pufferfish, and may then trigger an on-screen warning or label or an audible warning or indication that a pufferfish may have dangerous toxins or poison and/or foul-tasting materials.

In some embodiments, optionally, the marking or emphasis of visual indications of a marine animal, may be projected onto or into an inner-side or an outer-side of a see-through lens (or of two see-through lenses) of a glasses or a sunglasses that are worn by a human user, thereby allowing the user to view the real-life scenery around him while such scenery is also augmented by the marine animal markings or emphasis as well as with information about the detected marine animals.

In some embodiments, optionally, imager(s) 102 may be, or may comprise, a thermal imager 124 or a thermal-sensitive imager or an infrared imager, or a heat-seeking sensor or imager, able to distinguish objects based on their estimated or sensed temperature; thereby enabling the AR device 101 to detect and then mark or emphasize a marine animal based on its sensed temperature which is different from the temperature of surrounding water or surrounding sea floor. In some embodiments, the computer vision process or analysis may be based on both (i) images captured by an optical camera, and (ii) thermal data or temperature data acquired or sensed or measured by the thermal imager.

In some embodiments, optionally, the analysis or the recognition process or the detection process may further take into account acoustic data or audio which may be captured or acquired by an acoustic microphone of the AR device 101; for example, a marine animal may jump out of the water and land back into the water, or may otherwise make a splash sound, which may be captured via the acoustic microphone, and which may trigger the AR device 101 to perform the marine animal recognition process specifically on images or video frames that were captured at the same time (or, one second before) the splash sound or the other acoustic effect of the marine animal. In some embodiments, optionally, the acoustic noise that was captured, may be compared by the processor 109 to a set of pre-stored acoustic signatures or acoustic noises that characterize different marine animals (e.g., a sting-ray jump makes a louder and longer splash sound than a small fish jump), thereby allowing the processor 109 of the AR device 101 to further discern or distinguish or differentiate among possible candidates of marine animals based on their acoustic signature or audible noise.

Some embodiments may be implemented by using a smartphone or tablet, with an application or "app" that captures images or video of an area-of-interest; and performs real-time or near-real-time computerized vision analysis or image recognition analysis on such captured images or video frames; and then rapidly displays, on the screen of the smartphone or tablet, on-screen markings or emphasizing indicators that point to detected or recognized or identified marine animals or fish.

In some embodiments, optionally, a Picture-In-Picture (PIP) Unit 120 may be used, as part of the AR device 101 or as a unit associated therewith; such that a first portion of the display unit 110 shows the current, actual, real-life view as currently being acquired by the imager(s) 102; whereas a second, particular, region or portion of the display unit 110 shows, for example, a recently-captured image or frame of that area-of-interest in which there are added the augmented reality information or indicators or markings or emphasizing elements that emphasize the location and/or the properties of marine animal(s). In some embodiments, the PIP Unit 120 may generate the two regions as side-by-side frames or as side-by-side (vertically or horizontally) windows or tabs; or as the augmented reality window being a smaller window that is located within the non-augmented view, such as, at a top-right or top-left or bottom-right or bottom-left corner of the non-augmented view, hiding some (e.g., one quarter, or one eighth) of the non-augmented view, and presenting there a smaller-scale version of the area-of-interest with the augmented reality information on it. In other embodiments, the augmented reality view is presented across most, or all, of the display unit 110; and a smaller window or tab with the actual non-augmented view if shown on (and is hiding) a portion of the augmented reality (larger) window or tab or frame.

Optionally, a Haptic Feedback/Vibrations Unit 121 may be included in AR device 101, and may be triggered or activated or deployed by the Marine Animal(s) Detection Unit 105 or by the processor 109 or by the Computerized Vision Processing Unit 104 to generate haptic feedback and/or vibration(s) and/or to shake the AR device 101 (or portions thereof), as haptic feedback to the user that a marine animal is detected in the current field-of-view of the imager(s) 102, and/or that a marine animal that meets the pre-defined criteria that were set by this specific user is detected in the current field-of-view of the imager(s) 102. In some embodiments, a pattern of a legend of vibrations or haptic feedback types may be utilized; for example, a short (one second long) vibration may indicate detection of a small fish (under one foot), whereas a long (two seconds long) vibration may indicate detection of a large fish (over one foot in length), or whereas a series or several short bursts of vibrations may indicate a school of fish or a group of fish, or may indicate (in some embodiments) a particular type of marine animal (e.g., shark, sting ray) that was pre-defined by the user to trigger such set of vibrations.

Device 101 and/or system 100 may comprise other suitable hardware components and/or software components; for example, a power source 123 (e.g., battery, rechargeable battery); a Global Positioning System (GPS) unit or other location-finding unit or geo-location unit or localization unit; one or more accelerometers, gyroscopes, compass units, and/or device spatial orientation sensors, which may be used by the processor 109 for finding the location or the relative location or the direction or the relative direction of a detected marine animal, in real life and/or relative to the current location and the current spatial position and the current spatial orientation of the AR device 101; an Operating System (OS) and applications and drivers; and/or other suitable components.

In some embodiments, AR device 101, or its processor 109, may utilize one or more algorithms in order to estimate or determine a length or a size of a detected marine animal. In some embodiments, for example, an image recognition algorithm may identify or may recognize, in a single image or in a set of images taken from the same imager(s) 102, one or more fish that are identified (based on image comparison) as Golden Shiners; and one or more smaller fish that are also identified (based on image comparison) as Golden Shiners; and the AR device 101 or its processor 109 may thus determine that those fish are adult golden shiners and baby or young golden shiners; and the AR device 101 may have pre-configured or pre-defined rules, that indicate that an Adult Golden Shiner typically has a length of 20 centimeters; and therefore, based on this identification, the AR device 101 and/or its processor 109 may estimate or may approximate the length or the size of other, nearby, fish. For example, if the same image also contains another image-portion, in proximity to the Adult Golden Shiner, that is recognized to be a Red Snapper that occupies a length of 75 pixels in the image, near an Adult Golden Shiner that occupies 25 pixels in the image, then the length of the Red Snapper is estimated by the processor 109 as three times the length of an adult golden shiner, namely, a length of 60 centimeters.

In other embodiments, a length of a fish may be estimated based on other rules. For example, the processor 109 may recognize in an image, at least one fish that is known to have a generally uniform or common size or length; and may utilize that fish as calibration in order to estimate the size of other, nearby, fish that appear in the same image or that appear in other images that were taken by the same imager of the same area-of-interest of the same body-of-water. For example, the Applicant has realized that some particular species of fish have a generally uniform size or length, and do not grow beyond a pre-defined known length; for example: "Indonesian Superdwarf fish" or "Paedocypris Progenetica" has a generally typical or uniform length of 1 centimeter; "Pygmy Hatchetfish" or "Carnegiella myersi" has a generally typical or uniform length of 2 centimeters; "Harlequin Rasbora" or "Trigonostigma heteromorpha" has a generally typical or uniform length of 4 centimeters; "Gulf Coast Pygmy Sunfish" or "Elassoma gilberti" has a generally typical or uniform length of 2.25 centimeters; "Least Killifish" or "Heterandria Formosa" has a generally typical or uniform length of 2 centimeters; "Pepper Corydora" or "Corydoras paleatus" has a generally typical or uniform length of 5 centimeters; and so forth. Some of these fish, such as the "Pygmy Hatchetfish", have a very unique or distinctive shape or structure, which makes them good candidates for accurate image recognition or computer vision analysis. Based on the identification or recognition of these "standard-size fish", the length or size or other fish may be calculated accordingly, based on the ratio between (i) the number of pixels that the "calibration fish" occupies by its length, and (ii) the number of pixels that the "target fish" occupies by its length.

In another set of embodiments, the size of a fish or marine animal may be estimated based on other pre-defined rules. For example, the processor 109 may recognize a Hammerhead Shark in a captured image, based on image comparison or computer vision analysis that identifies the unique and distinctive shape of that marine animal. The processor 109 may be pre-configured with a rule, that even a baby or freshly-born Hammerhead Shark is typically 50 centimeters long; and therefore, the processor 109 may determine that the size of that particular Hammerhead Shark that was captured in the image is at least 50 centimeters. This may then be used to estimate the size of other fish, taking into account pre-defined values of the typical or mots common length of each fish species, the minimum length thereof, and the maximum length thereof. For example, if a Bluegill fish is recognized, then processor 109 may utilize a pre-defined rule that Bluegill fish can have a length of not more than 35 centimeters, and may use this information for "calibration" purposes, to estimate the size or the relative size of other fish captured by the same imager. For example, a nearby fish, which appears in the captured image to be twice the length of a recognized Bluegill fish, can have a size that is not more than 70 centimeters long; and if that nearby marine animal is actually a Hammerhead Shark, which is known to be born having a length of 50 centimeter, then the processor 109 is able to determine, at high level of confidence or certainty, that this particular Hammerhead Shark has a length of 50 to 70 centimeters, or has a length that is estimated at 60 centimeters (e.g., the average of that range of values).

In some embodiments, optionally, estimated length or size of marine animals or fish, may further be utilized for estimating or determining their distance from the imager(s) 102 or from the AR device 101. For example, the AR device 101 may be equipped with two imagers 102, that capture images of the same area-of-interest; two images are captured concurrently; they show the same Hammerhead Shark, which was already estimated at having 60 centimeters length, being at a displacement of "half its body" between the two images (namely, the location of that Hammerhead Shark in the image taken by the first imager, is displaced by half-its-length, relative to the location of that Hammerhead Shark in the image taken concurrently by the second imager". The processor 109 may utilize a pre-defined rule that translates or converts this information into distance measures; for example, using the rule of "multiply the displacement by ten": the displacement of the shark was half its body length, which is 30 centimeters (half of 60 centimeters); multiplying this value by 10 gives 300 centimeters, or 3 meters; and therefore, the distance of that shark from the imagers is estimated to be 3 meters. Other suitable methods may be used to estimate distance; such as, based on parallax or based on difference of angular position.

In other embodiments, AR device 101 may optionally comprise one or more distance sensors or proximity sensors or ranging sensors or range-determining sensors or Light Detection and Ranging (LiDAR) sensor, which are able to output or transmit a signal (e.g., laser, infrared light, ultrasonic wave) and then measures the change of the signal upon its return (e.g., change in the signal intensity, and/or the time that it takes the signal to return), and are able to estimate or determine or measure the distance of an identified marine animal from the AR device 101. The distance information may be added to the Augmented Reality information layer that is projected or is otherwise visualized or conveyed to the user.

In some embodiments, processor 109 may further estimate or determine the relative location or the relative direction in which the recognized marine animal is located. For example, the rectangular image that is captured by imager 102, may be divided to a grid of 3 columns by 3 rows, thereby dividing the image into nine image-regions having identical size and shape; processor 109 may recognize a Swordfish in the bottom-right corner of the image, or in the bottom-right image-portion of those nine image portions; and this may be, in some embodiments, sufficient in order to correctly signal or mark or emphasize to the user the real-life location of that marine animal. For example, a projecting unit or a visualizing unit, or the Marine Animal Indicator Unit, may proceed to mark with an Augmented Reality border or frame or color-emphasis or with an AR arrow, the bottom-right segment of the grid of 9 image-segments, thereby providing a useful indication to the human user that a marine animal was detected in that particular region. This information may be valuable and useful, as it guides the human user to focus his viewing attention to ⅑ of his entire field-of-view, and further points out to him which particular one-ninth of the field-of-view (the lower-right portion) he should observe more carefully and attentively. In other embodiments, the captured image may be divided to a grid of 4 by 4 (creating 16 segments), or a grid of 5 by 5 segments (creating 25 segments), or a grid of 5 by 4 segments (creating 20 segments), or the like; thereby providing a different level of granularity to the localization of the marine animal within the field-of-view.

Figure 2:
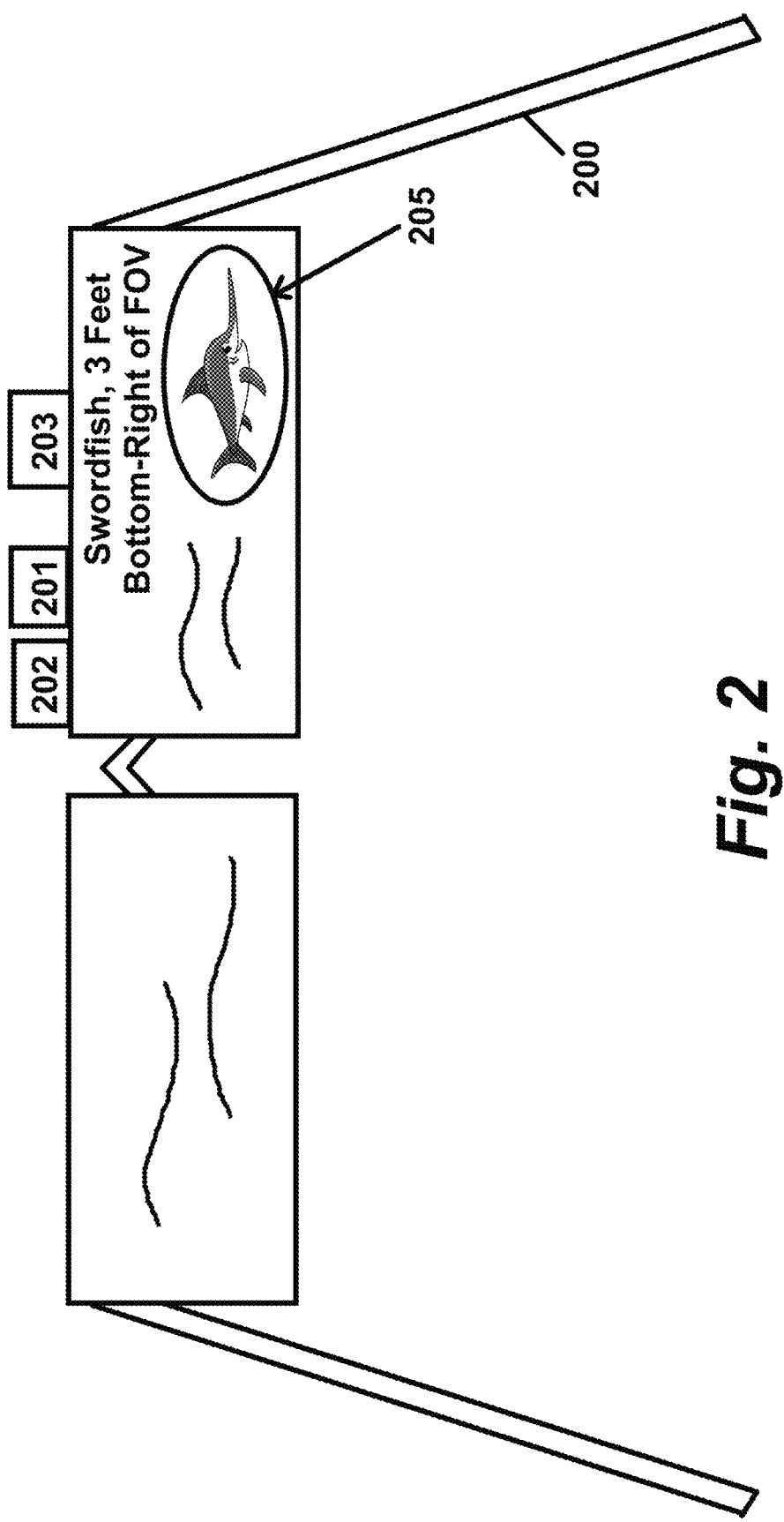
FIG. 2 is a schematic illustration of glasses, in accordance with some demonstrative embodiments of the present invention.

Reference is made to FIG. 2, which is a schematic illustration of glasses 200, in accordance with some demonstrative embodiments of the present invention. Glasses 200 may be, for example, eye-glasses or eyeglasses or spectacles, or sunglasses, or polarized glasses, or polarized sunglasses, or non-polarized glasses, or non-polarized sunglasses, or protective eyewear, or other type of vision aid or goggles. Glasses 200 may include, for example, two lenses (e.g., a right-side lens that would be in front of a wearer's right eye; and a left-side lens that would be in front of the wearer's left eye), made of plastic or glass or other see-through material or made of a transparent material or made of a semi-transparent material or a translucent material); held in place, or mounted within, a frame having two temple-pieces or arms (e.g., to enable wearing around the temples and over the ears of the wearer) and a nose-bridge. Glasses 200 may comprise an imager 201, and a processing unit 202 able to perform computer vision analysis and/or image recognition analysis on captured images. A projecting unit 203 may project an Augmented Reality (AR) information layer onto or into one of the lenses or both of the lenses, such that an emphasis or a marking or a visual indication of a detected marine animal is viewed by the user, super-imposed on the real-life field-of-view that the user is able to view through the glasses. For demonstrative purposes, as a non-limiting example, the left-side lens depicts a body of water; and the right-side lens depicts an added Augmented Reality (AR) marking 205, which is added onto or is projected onto the right-side lens, at a particular location such that the AR marking 205 surrounds or encapsulates or indicates a particular marine animal (e.g., a fish) that was detected via computerized vision or via image recognition. Optionally, a textual label is also projected or displayed or super-imposed on the lens of glasses 200, by the projecting unit 203, to display AR data about the detected marine animal; such as, indicating its type ("swordfish"), it size ("3 feet"), and its location or relative location ("bottom-right of field-of-view).

For demonstrative purposes, projecting unit 203 is shown as located above or at the top portion of the frame of glasses 200; however, this is only a demonstrative example; and in some embodiments, the projecting unit 203 (or, the visualizing unit of the device, or the marine animal indicator unit) may be located in other suitable location of glasses 200 (or in AR device 101), in order to achieve efficient and correct projection of the AR layer or the AR marking or the AR emphasis or the AR information onto the correct region of the lens(es) of glasses 200 and/or onto the correct viewing region of the screen of the AR device 101. For example, the projecting unit or the visualizing unit or the AR projection unit may be located at the tip or at the end of a rod or a protrusion, which may protrude upwardly (e.g., 5 or 10 centimeters upwardly) and/or forwardly (e.g., 5 or 10 centimeters forwardly, away from the wearer's face) relative to the frame of glasses 200, in order to allow such projecting unit to be above-and-forward relative to the lens(es) of glasses 200, and to provide a sufficient distance (e.g., 2 or 3 or 5 or 7 or 10 centimeters of diagonal distance) for the projecting unit to project the AR layer onto the lens(es). In some embodiments, one or more optical elements (e.g., lens, prism, mirror) may be utilized in or projecting unit 203 and/or in conjunction with it, to enable it to produce and project the AR layer at the correct direction and size, such that the AR layer of information would fit within the suitable region of the lens(es) of glasses 200.

In some embodiments, the processor may perform the relevant calculations, in order to determine the content of the AR layer that is being generated and projected, and may take into account, for example, the known physical distance between the projecting unit and the target lens(es) of glasses 200, as well as the size of each lens of glasses 200; such that the processor may instruct or configure or adjust the projecting operations, performed by the projecting unit, to fit the AR layer correctly within the target lens. In some embodiments, the processor may further take into account, or may estimate or determine based on geometrical calculations, the line-of-sight between (i) an eye of the wearer, and (ii) the estimated location of the marine animal that was detected; such that the processor would instruct the projecting unit to project, specifically to the lens-portion or lens-location or lens-region of the lens that is on that line-of-sight, the AR marking or the AR emphasis that points to that marine animal or that otherwise indicates it visually or emphasizes it. In some embodiments, the processor may utilize pre-defined values or user-configurable values for such calculations; for example, a pre-defined value of 3 centimeters of distance between the human eye and the proximal lens of glasses 200.

In some embodiments, some or all of the components of glasses 200, or those of the AR device 100 of FIG. 1, are co-located at very short proximity to each other (e.g., within a form-factor of 1 or 2 or 5 or up to 10 centimeters), to reduce the overall form-factor of the device, and/or to reduce (or to almost eliminate) a parallax effect between the field-of-view of the imager and the display shown to the user via the lenses or via the display unit or screen.

In some embodiments, glasses 200 may be an entirely stand-alone device or an autonomous device or an offline device, which does not communicate or does not need to communicate, via any wireless communication link and/or via any wired communication link, with any remote device or with any remote server, for the purpose of computer vision and/or image recognition; such that all the operations are performed locally by and in the glasses 200. This unique architecture and structure may contribute significantly to reducing the form-factor and the weight of the glasses 200, as there is no need to incorporate a transceiver, and/or as a smaller-size power-source may be used (since the glasses 200 do not need wireless communications, which are power consuming); and this structure may also yield rapid local processing, since image data does not need to be transferred slowly to a remote server, but rather, image data is immediately and locally processed within the glasses 200 autonomously, thereby providing a light-weight, small form-factor yet powerful AR device. Optionally, a Bluetooth transceiver may be utilized, or a wire-based connection (e.g., via a USB port or socket), to connect the glasses 200 with another electronic device (e.g., smartphone, tablet, laptop computer, desktop computer) for the purpose of configuring or modifying user-defined Filtering Constraints that are utilized by the glasses.

In some embodiments, the imager 201 and/or the processing unit 202 and/or the projecting unit 203 may be integrated (entirely, or at least partially) into or within a frame of glasses 200 which also holds the two lenses and the two temple-pieces; thereby reducing the form-factor of glasses 200, and providing to glasses 200 a look and feel of a regular pair of glasses without bulky protruding elements.

In some embodiments, glasses 200 may optionally include an activation/deactivation physical switch or mechanical button, which enables the user to efficiently and rapidly switch between two modes of operation: (i) a first mode of operation, in which at least the projecting unit 203 is deactivated or turned off, such that glasses 200 operate temporarily as a conventional set of see-through glasses without any projection of AR layer or AR information; and (b) a second mode of operation, in which the projecting unit 203 is activated or turned on, such that glasses 200 operate as described above and project the AR layer or AR information that is super-imposed on the field-of-view of the user. This enables the user to switch on the AR functionality for a short period of time, such as for 1 or 2 or 3 seconds, and to view more clearly the AR-emphasized or the AR-marked marine animal, and to then switch off the AR functionality and continue to follow the marine animals without the AR marking.

For example, in some embodiments, the physical button or switch may be toggled by the use between two positions: a position in which the projecting unit (or the AR display unit) is activated, and a position in which the projecting unit (or the AR display unit) is deactivated; and in both of these positions, the imager(s) and/or the processor continue to operate, capture images, and process them in real time or in near-real-time, in order to enable rapid deployment of the AR layer once the user toggles the switch from non-projecting mode to projecting mode. In another set of embodiments, the physical button or switch may be toggled by the use between two positions: a position in which the projecting unit (or the AR display unit) is activated, and a position in which the projecting unit (or the AR display unit) is deactivated; and in the first position, the imager(s) and/or the processor operate, capture images, and process them in real time or in near-real-time; while in the second position, the imager and/or the processor are deactivated or are in stand-by mode; to save energy consumption.

In another set of embodiments, the projecting of the AR layer may be actuated only upon, and as long as, the user pressing and holding-down or continuously touching a button or a touch-surface; such that the AR device or the glasses operate as a see-through device without an AR layer, and only when (and, as long as) the user touches or pushes the button (or the particular touch-sensitive surface), the AR layer is projected or displayed to him. This may allow the user to conveniently view his field-of-view using his regular human observation skills, and to selectively command the device to perform an ad hoc image analysis and computer vision with AR projection of markings for identified marine animal only upon demand and only when the user touches or presses the actuation button or element.

Some embodiments of the present invention may provide one or more benefits or advantages. For example, some embodiments may assist a user to view or notice or see particular marine animals that are otherwise difficult to notice, and thus may contribute to nature hobbyists or to a fish watching enthusiastic. Some embodiments may assist a fisherman to decide where, or when, or to which direction, to cast his fishing rod or his fishing net.

Embodiments of the present invention are not limited to detection or recognition of marine animals in a body-of-water, or to generating and conveying of information about such marine animals via an augmented reality layer. Rather, some embodiments of the present invention may similarly be utilized, constructed and/or configured, to detect or recognize other objects in a body-of-water (e.g., to detect treasure boxes or archeological artifacts in a body-of-water); or, to detect or recognize other types of animals (e.g., not necessarily marine animals) in an area-of-interest which may not necessarily be (or, may not necessarily include) a body-of-water, such as, for example, to detect or recognize land animals or birds in a forest or a nature center or a desert or a park or other land-based environment or non-marine environment, or to detect and recognize and provide an augmented reality layer of information about animals in a safari or in a zoo or in nature, or the like.

Some embodiments of the present invention include wearable glasses (e.g., eyeglasses, sunglasses) which comprise: two see-through lenses, comprising a right-side lens intended to be in front of a right eye of a human wearer, and a left-side lens intended to be in front of a left-eye of the human wearer; a camera, to capture images of an area-of-interest that includes at least a portion of a body of water; a processor, to locally perform, within said eyeglasses, a computerized vision process on said images, and to detect a particular marine animal in one or more of said images; a marine animal indicator unit, to generate an indicator to said human wearer, that said particular marine animal was detected within said area-of-interest of said body of water.

In some embodiments, the marine animal indicator unit comprises: a visualizing unit, to generate a visual indication that is projected onto at least one of said two see-through lenses, and that visually indicates an augmented reality emphasis of said particular marine animal to said wearer.

In some embodiments, the processor is to estimate, based on computerized vision analysis of said images, a real-life location of said particular marine life animal within said area-of-interest of said body-of-water; wherein the marine animal indicator unit comprises: a visualizing unit, to generate a visual indication that is projected onto at least one of said two see-through lenses, and that visually conveys to said wearer as an augmented reality layer the real-life location of said marine animal as estimated by said processor.

In some embodiments, the processor is to determine, based on computerized vision analysis of said images, an animal-type of said particular marine animal; wherein the marine animal indicator unit comprises: a visualizing unit, to generate a visual indication that is projected onto at least one of said two see-through lenses, and that visually conveys to said wearer as an augmented reality layer the animal-type of said marine animal as determined by said processor.

In some embodiments, the processor is to estimate, based on computerized vision analysis of said images, an estimated real-life size of said particular marine life animal; wherein the marine animal indicator unit comprises: a visualizing unit, to generate a visual indication that is projected onto at least one of said two see-through lenses, and that visually conveys to said wearer as an augmented reality layer the estimated real-life size of said marine animal as estimated by said processor.

In some embodiments, the processor is to estimate, based on computerized vision analysis of said images, an estimated real-life size of said particular marine animal; wherein, if the estimated real-life size of said particular marine life animal, is equal to or greater than a threshold value, then the processor is to include in an augmented reality layer for said area-of-interest an emphasized visual marking of said particular marine animal; wherein, if the estimated real-life size of said particular marine life animal, is smaller than said threshold value, then the processor is to exclude from said augmented reality layer for said area-of-interest an emphasized visual marking of said particular marine animal.

In some embodiments, the processor is to estimate, based on computerized vision analysis of said images, an estimated animal-type of said particular marine animal; wherein, if the estimated animal-type of said particular marine animal, is one of a set of one or more animal-types that are pre-defined to be visually emphasized, then the processor is to include in an augmented reality layer for said area-of-interest an emphasized visual marking of said particular marine animal of said particular animal-type; wherein, if the estimated animal-type of said particular marine animal, is not within said set of one or more animal-types that are pre-defined to be visually emphasized, then the processor is to exclude in said augmented reality layer for said area-of-interest an emphasized visual marking of said particular marine animal.

In some embodiments, the processor is to determine, based on computerized vision analysis of said images, determined animal-types of two or more marine animals that are recognized by the processor in said images; wherein, based on a set of one or more marine animals that are pre-defined for inclusion or for exclusion in augmented reality information, the processor is: (i) to include in an augmented reality layer for said area-of-interest an emphasized visual marking of a first marine animal which is of a first animal-type, and (ii) to exclude from said augmented reality layer for said area-of-interest an emphasized visual marking of a second marine animal which is of a second, different, animal-type.

In some embodiments, the processor is to perform said computerized vision process on said images, locally and autonomously in said glasses, based exclusively on pre-defined rules and data that are pre-stored in a memory unit of said glasses, and without transmitting to any remote server any captured image and any portion of a captured image.

In some embodiments, the marine animal indicator unit comprises: a visualizing unit, to generate a visual indication that is projected onto at least one of said two see-through lenses, and that visually emphasizes or marks to said wearer, via an augmented reality marking, said particular marine animal.

In some embodiments, the marine animal indicator unit comprises: a laser beam generator, to generate a visible laser beam directed from said glasses at an estimated real-life location of said particular marine animal.

In some embodiments, the marine animal indicator unit comprises: an illumination beam generator, to generate a non-laser visible light beam directed from said glasses at an estimated real-life location of said particular marine animal.

In some embodiments, the marine animal indicator unit comprises: an audio generator unit, to generate an audio message indicating to said wearer at least one of: (i) that said particular marine animal was detected by said processor in at least one of said images, (ii) an estimated real-life location of said particular marine animal, (iii) a characteristic of said particular marine animal.

In some embodiments, the processor is configured to perform, locally within said glasses, only a portion, and not all, of said computerized vision process; wherein the glasses further comprise: a wireless transmitter, to wirelessly transmit at least one image captured by said camera, to a remote server; a wireless receiver, to wirelessly receive from said remote server an incoming message indicating to said processor one or more marine animals that said remote server recognized within said at least one image.

In some embodiments, the glasses further comprise: a wireless transceiver, to wirelessly transmit to a nearby electronic device of the wearer, a message carrying information describing said particular marine animal that was detected by the processor in said images of said area-of-interest; wherein said message triggers and enables said electronic device of the wearer to display said information describing said particular marine animal on a digital screen of said electronic device.

In some embodiments, the glasses further comprise a thermal imager; wherein the processor is to perform said computerized vision process, and to detect said particular marine animal, based cumulatively on (I) one or more images captured by the camera of the glasses, and (II) thermal data acquired by the thermal imager of the glasses.

In some embodiments, wherein the marine animal indicator unit is to generates an augmented reality visual indicator of said particular marine animal, but to project said augmented reality visual indicator only on one lens of said two lenses, and not on both of said two lenses; to enable the wearer (I) to see a non-augmented view of said area-of-interest when the wearer closes his first eye and opens his second eye, and (II) to see an augmented view of said area-of-interest when the wearer closes his second eye and opens his first eye.

In some embodiments, wherein the glasses further comprise an acoustic microphone to acquire audio from said area-of-interest; wherein the processor is to perform said computerized vision process, and to detect said particular marine animal, based cumulatively on (I) one or more images captured by the camera of the glasses, and (II) analysis of audio acquired from said area-of-interest and recognition of a particular acoustic signature of said particular animal.

In some embodiments, the glasses are polarized sunglasses that further protect eyes of the wearer against bright sunlight and high-energy visible light; wherein the marine animal indicator unit is to project an augmented reality layer, which has a marking emphasizing said particular marine animal, onto at least one polarized lens of said sunglasses.

In some embodiments, the glasses are polarized sunglasses that further protect eyes of the wearer against bright sunlight and high-energy visible light; wherein the marine animal indicator unit is to project an augmented reality layer, which has a marking emphasizing said particular marine animal, onto at least one polarized lens of said sunglasses; wherein the glasses further comprise a touch-sensitive surface which faces outwardly relative to a human wearer of the glasses; wherein the marine animal indicator unit is to become actuated and operational and to project said augmented reality layer only when said touch-sensitive button is touched by the human wearer; wherein said augmented reality layer is not projected onto any of said polarized lens when said touch-sensitive button is not touched by the human wearer, as the projecting unit or the visualizing unit is non-actuated or non-operational if the touch-sensitive button or surface is not touched (e.g., by a finger of the human wearer).

In some embodiments, the camera, the processor, and the marine animal indicator unit are integrated within a frame of the glasses which holds the two see-through lenses.

Some embodiments of the present invention include an apparatus comprising: a wearable mounting unit, adapted to be mounted on or around a user's head or face; a camera to capture one or more images of a body of water; a processor to perform a computerized vision process on said images, and to detect one or more marine animals in said images; a visualizing unit, to generate a visual indication to said user, indicating to said user a real-life location of said one or more marine animals in said body of water.

In some embodiments, the visualizing unit comprises a projecting unit adapted to project to a display unit, at least one of said one or more images with one or more visual added markings of said one or more marine animals.

In some embodiments, the visualizing unit comprises one or more see-through lenses of glasses suitable for wearing; wherein the visualizing unit comprises to project onto said one or more see-through lenses of glasses, at least one of said one or more images with one or more visual added markings of said one or more marine animals.

In some embodiments, the processor is to perform a computerized vision process on said images and to detect at least one marine animal of a particular user-selectable animal-type; wherein the visualizing unit is to generate visual indications only of marine animals that belong to said user-selectable animal-type.

In some embodiments, the processor is to perform a computerized vision process on said images and to detect at least one marine animal of having a length that is greater than a pre-defined threshold value; wherein the visualizing unit is to generate visual indications only of marine animals that have said length that is greater than said pre-defined threshold value.

In some embodiments, the processor is to perform a computerized vision process on said images and to detect at least a first detected marine animal that is greater in length than a second detected marine animal; wherein the visualizing unit is to selectively generate visual indications only of the first detected marine animal and not the second detected marine animal.

In some embodiments, the processor is to perform a computerized vision process on said images and to detect at least (a) a first detected marine animal that is of a first animal-type, and (b) a second detected marine animal that is of a second animal-type; wherein the visualizing unit is to selectively generate visual indications only of the first detected marine animal and not the second detected marine animal.

In some embodiments, the visualizing unit comprises a laser beam generator, to generate a visible laser beam directed at the real-life location of one of said one or more marine animals.

In some embodiments, the visualizing unit comprises an illumination unit, to generate a beam of light that is directed towards the real-life location of one of said one or more marine animals.

In some embodiments, the apparatus comprises an audio generating unit, to generate an audible audio message indicating to said user the real-life location of at least one of said one or more marine animals.

In some embodiments, the processor is to determine an animal-type of at least one of said one or more marine animals; wherein the visualizing unit is to generate a visual indication of said animal-type which accompanies the visual indication of a detected marine animal.

In some embodiments, the processor is to determine an animal-type of at least one of said one or more marine animals; wherein the apparatus further comprises an audio generating unit, to generate an audible audio message indicating to said user said animal-type of said detected marine animal.

In some embodiments, the processor is configured to perform, locally within said apparatus, only a portion, and not all, of said computerized vision process; wherein the apparatus further comprises: a wireless transmitter, to wirelessly transmit at least one image captured by said camera, to a remote server; a wireless receiver, to wirelessly receive from said remote server an incoming message indicating one or more marine animals that said remote server detected within said at least one image.

In some embodiments, the apparatus is a pair of glasses or sunglasses suitable for wearing by a human.

In some embodiments, the apparatus is a wearable Augmented Reality (AR) article configured for being worn by a human.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, accelerometer(s), gyroscope(s), compass unit(s), device orientation sensor(s), network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

In some embodiments, a system or an apparatus may comprise at least one processor or that is communicatively coupled to a memory unit and configured to operate execute code, wherein the at least one processor is further configured to perform the operations and/or the functionalities describes above.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a legend list or a database of possible values or ranges; a comparison or matching or searching process which searches for matches and/or identical results and/or similar results among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. Glasses comprising:
two see-through lenses, comprising a right-side lens intended to be in front of a right eye of a human wearer, and a left-side lens intended to be in front of a left-eye of the human wearer;
a camera, to capture images of an area-of-interest that includes at least a portion of an environment;
a processor, to locally perform, within said glasses, a computerized vision process on said images, and to detect a particular animal in one or more of said images;
an animal indicator unit, to generate an indicator to said human wearer, that said particular animal was detected within said area-of-interest of said environment;
wherein the glasses further comprise a thermal imager;
wherein the processor is configured to perform said computerized vision process, and to detect said particular animal, based cumulatively on (I) one or more images captured by the camera of the glasses, and (II) thermal data acquired by the thermal imager of the glasses.

2. The glasses of claim 1,
wherein the animal indicator unit comprises:
a visualizing unit, to generate a visual indication that is projected onto at least one of said two see-through lenses, and that visually indicates an augmented reality emphasis of said particular animal to said human wearer.

3. The glasses of claim 1,
wherein the processor is configured to estimate, based on computerized vision analysis of said images, a real-life location of said particular animal within said area-of-interest of said environment;
wherein the animal indicator unit comprises:
a visualizing unit, to generate a visual indication that is projected onto at least one of said two see-through lenses, and that visually conveys to said human wearer as an augmented reality layer the real-life location of said animal as estimated by said processor.

4. The glasses of claim 1,
wherein the processor is configured to determine, based on computerized vision analysis of said images, an animal-type of said particular animal;
wherein the animal indicator unit comprises:
a visualizing unit, to generate a visual indication that is projected onto at least one of said two see-through lenses, and that visually conveys to said human wearer as an augmented reality layer the animal-type of said animal as determined by said processor.

5. The glasses of claim 1,
wherein the processor is configured to estimate, based on computerized vision analysis of said images, an estimated real-life size of said particular animal;
wherein the animal indicator unit comprises:
a visualizing unit, to generate a visual indication that is projected onto at least one of said two see-through lenses, and that visually conveys to said human wearer as an augmented reality layer the estimated real-life size of said animal as estimated by said processor.

6. The glasses of claim 1,
wherein the processor is configured to estimate, based on computerized vision analysis of said images, an estimated real-life size of said particular animal;
wherein, if the estimated real-life size of said particular animal, is equal to or greater than a threshold value, then the processor is to include in an augmented reality layer for said area-of-interest an emphasized visual marking of said particular animal;
wherein, if the estimated real-life size of said particular animal, is smaller than said threshold value, then the processor is to exclude from said augmented reality layer for said area-of-interest an emphasized visual marking of said particular animal.

7. The glasses of claim 1,
wherein the processor is configured to estimate, based on computerized vision analysis of said images, an estimated animal-type of said particular animal;
wherein, if the estimated animal-type of said particular animal, is one of a set of one or more animal-types that are pre-defined to be visually emphasized, then the processor is to include in an augmented reality layer for said area-of-interest an emphasized visual marking of said particular animal of said particular animal-type;
wherein, if the estimated animal-type of said particular animal, is not within said set of one or more animal-types that are pre-defined to be visually emphasized, then the processor is to exclude in said augmented reality layer for said area-of-interest an emphasized visual marking of said particular animal.

8. The glasses of claim 1,
wherein the processor is configured to perform said computerized vision process on said images, locally and autonomously in said glasses, based exclusively on pre-defined rules and data that are pre-stored in a memory unit of said glasses, and without transmitting to any remote server any captured image and any portion of a captured image.

9. The glasses of claim 1,
wherein the animal indicator unit comprises:
a visualizing unit, to generate a visual indication that is projected onto at least one of said two see-through lenses, and that visually emphasizes or marks to said human wearer, via an augmented reality marking, said particular animal.

10. The glasses of claim 1,
wherein the animal indicator unit comprises:
a laser beam generator, to generate a visible laser beam directed from said glasses at an estimated real-life location of said particular animal.

11. The glasses of claim 1,
wherein the animal indicator unit comprises:
an illumination beam generator, to generate a non-laser visible light beam directed from said glasses at an estimated real-life location of said particular animal.

12. The glasses of claim 1,
wherein the animal indicator unit comprises:
an audio generator unit, to generate an audio message indicating to said human wearer at least one of: (i) that said particular animal was detected by said processor in at least one of said images, (ii) an estimated real-life location of said particular animal, (iii) a characteristic of said particular animal.

13. The glasses of claim 1,
wherein the processor is configured to perform, locally within said glasses, only a portion, and not all, of said computerized vision process;
wherein the glasses further comprise:
a wireless transmitter, to wirelessly transmit at least one image captured by said camera, to a remote server;
a wireless receiver, to wirelessly receive from said remote server an incoming message indicating to said processor one or more animals that said remote server recognized within said at least one image.

14. The glasses of claim 1,
wherein the glasses further comprise:
a wireless transceiver, to wirelessly transmit to a nearby electronic device of the human wearer, a message carrying information describing said particular animal that was detected by the processor in said images of said area-of-interest;
wherein said message triggers and enables said electronic device of the human wearer to display said information describing said particular animal on a digital screen of said electronic device.

15. The glasses of claim 1,
wherein the camera, the processor, and the animal indicator unit are integrated within a frame of the glasses which holds the two see-through lenses.

16. The glasses of claim 1, wherein the glasses are polarized sunglasses that further protect eyes of the human wearer against bright sunlight and high-energy visible light;
wherein the animal indicator unit is to project an augmented reality layer, which has a marking emphasizing said particular animal, onto at least one polarized lens of said sunglasses.

17. Glasses comprising:
two see-through lenses, comprising a right-side lens intended to be in front of a right eye of a human wearer, and a left-side lens intended to be in front of a left-eye of the human wearer;
a camera, to capture images of an area-of-interest that includes at least a portion of an environment;
a processor, to locally perform, within said glasses, a computerized vision process on said images, and to detect a particular animal in one or more of said images;
an animal indicator unit, to generate an indicator to said human wearer, that said particular animal was detected within said area-of-interest of said environment;
wherein the processor is to determine, based on computerized vision analysis of said images, determined animal-types of two or more animals that are recognized by the processor in said images;
wherein, for a set of one or more animals that are pre-defined for inclusion or for exclusion in augmented reality information, the processor is configured: (i) to include in an augmented reality layer for said area-of-interest an emphasized visual marking of a first animal which is of a first animal-type, and (ii) to exclude from said augmented reality layer for said area-of-interest an emphasized visual marking of a second animal which is of a second, different, animal-type.

18. Glasses comprising:
two see-through lenses, comprising a right-side lens intended to be in front of a right eye of a human wearer, and a left-side lens intended to be in front of a left-eye of the human wearer;
a camera, to capture images of an area-of-interest that includes at least a portion of an environment;
a processor, to locally perform, within said glasses, a computerized vision process on said images, and to detect a particular animal in one or more of said images;
an animal indicator unit, to generate an indicator to said human wearer, that said particular animal was detected within said area-of-interest of said environment;
wherein the animal indicator unit is to generates an augmented reality visual indicator of said particular animal, but to project said augmented reality visual indicator only on one lens of said two lenses, and not on both of said two lenses,
to enable the human wearer (I) to see a non-augmented view of said area-of-interest when the human wearer closes his first eye and opens his second eye, and (II) to see an augmented view of said area-of-interest when the human wearer closes his second eye and opens his first eye.

19. Glasses comprising:
two see-through lenses, comprising a right-side lens intended to be in front of a right eye of a human wearer, and a left-side lens intended to be in front of a left-eye of the human wearer;
a camera, to capture images of an area-of-interest that includes at least a portion of an environment;
a processor, to locally perform, within said glasses, a computerized vision process on said images, and to detect a particular animal in one or more of said images;
an animal indicator unit, to generate an indicator to said human wearer, that said particular animal was detected within said area-of-interest of said environment;
wherein the glasses further comprise an acoustic microphone to acquire audio from said area-of-interest of said environment;
wherein the processor is to perform said computerized vision process, and to detect said particular animal, based cumulatively on (I) one or more images captured by the camera of the glasses, and (II) analysis of audio acquired from said area-of-interest and recognition of a particular acoustic signature of said particular animal.

20. Glasses comprising:
two see-through lenses, comprising a right-side lens intended to be in front of a right eye of a human wearer, and a left-side lens intended to be in front of a left-eye of the human wearer;
a camera, to capture images of an area-of-interest that includes at least a portion of an environment;
a processor, to locally perform, within said glasses, a computerized vision process on said images, and to detect a particular animal in one or more of said images;
an animal indicator unit, to generate an indicator to said human wearer, that said particular animal was detected within said area-of-interest of said environment;
a touch-sensitive surface which faces outwardly relative to the human wearer of the glasses;
wherein the animal indicator unit is to project said augmented reality layer only when said touch-sensitive button is touched by the human wearer;
wherein said augmented reality layer is not projected onto any of said lenses when said touch-sensitive button is not touched by the human wearer.

\* \* \* \* \*